US009176952B2

(12) United States Patent
Aikawa et al.

(10) Patent No.: US 9,176,952 B2
(45) Date of Patent: Nov. 3, 2015

(54) COMPUTERIZED STATISTICAL MACHINE TRANSLATION WITH PHRASAL DECODER

(75) Inventors: Takako Aikawa, Seattle, WA (US); Achim Ruopp, Washington, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1559 days.

(21) Appl. No.: 12/238,207

(22) Filed: Sep. 25, 2008

(65) Prior Publication Data

US 2010/0076746 A1 Mar. 25, 2010

(51) Int. Cl.
*G06F 17/28* (2006.01)
*G06F 17/27* (2006.01)

(52) U.S. Cl.
CPC ........ *G06F 17/2818* (2013.01); *G06F 17/2775* (2013.01); *G06F 17/289* (2013.01); *G06F 17/2827* (2013.01)

(58) Field of Classification Search
CPC ............ G06F 17/2818; G06F 17/2827; G06F 17/2854
USPC ...................................................... 704/1–10
See application file for complete search history.

(56) References Cited

U.S. PATENT DOCUMENTS

| | | | |
|---|---|---|---|
| 5,995,920 A * | 11/1999 | Carbonell et al. | 704/9 |
| 6,347,316 B1 * | 2/2002 | Redpath | 1/1 |
| 6,438,515 B1 * | 8/2002 | Crawford et al. | 704/5 |
| 6,985,850 B1 * | 1/2006 | Scanlan | 704/2 |
| 7,171,348 B2 * | 1/2007 | Scanlan | 704/2 |
| 7,383,542 B2 | 6/2008 | Richardson et al. | |
| 7,584,092 B2 * | 9/2009 | Brockett et al. | 704/9 |
| 7,587,307 B2 * | 9/2009 | Cancedda et al. | 704/2 |
| 7,984,034 B1 * | 7/2011 | Shaw | 707/706 |

(Continued)

FOREIGN PATENT DOCUMENTS

WO 2008019509 A1 2/2008
WO 2008083503 A1 7/2008

OTHER PUBLICATIONS

Franz Josef Och. 2003. Minimum error rate training in statistical machine translation. In Proceedings of the 41st Annual Meeting on Association for Computational Linguistics—vol. 1 (ACL '03), vol. 1. Association for Computational Linguistics, Stroudsburg, PA, USA, 160-167. DOI=10.3115/1075096.1075117 http://dx.doi.org/10.3115/1075096.1075117.*

(Continued)

*Primary Examiner* — Matthew Baker
(74) *Attorney, Agent, or Firm* — Sandy Swain; Micky Minhas

(57) ABSTRACT

A computerized system for performing statistical machine translation with a phrasal decoder is provided. The system may include a phrasal decoder trained prior to run-time on a monolingual parallel corpus, the monolingual parallel corpus including a machine translation output of source language documents of a bilingual parallel corpus and a corresponding target human translation output of the source language documents, to thereby learn mappings between the machine translation output and the target human translation output. The system may further include a statistical machine translation engine configured to receive a translation input and to produce a raw machine translation output, at run-time. The phrasal decoder may be configured to process the raw machine translation output, and to produce a corrected translation output based on the learned mappings for display on a display associated with the system.

18 Claims, 2 Drawing Sheets

(56) References Cited

U.S. PATENT DOCUMENTS

| | | | |
|---|---|---|---|
| 8,046,211 B2* | 10/2011 | Li et al. | 704/2 |
| 8,046,233 B2* | 10/2011 | Schurig | 704/277 |
| 8,060,360 B2* | 11/2011 | He | 704/9 |
| 8,886,514 B2* | 11/2014 | Ueffing | 704/2 |
| 2003/0023423 A1* | 1/2003 | Yamada et al. | 704/2 |
| 2004/0002848 A1* | 1/2004 | Zhou et al. | 704/2 |
| 2004/0024581 A1* | 2/2004 | Koehn et al. | 704/2 |
| 2004/0172235 A1* | 9/2004 | Pinkham et al. | 704/2 |
| 2004/0260532 A1* | 12/2004 | Richardson et al. | 704/2 |
| 2005/0021322 A1* | 1/2005 | Richardson et al. | 704/2 |
| 2005/0228643 A1* | 10/2005 | Munteanu et al. | 704/9 |
| 2006/0095248 A1 | 5/2006 | Menezes et al. | |
| 2006/0106592 A1* | 5/2006 | Brockett et al. | 704/1 |
| 2006/0106595 A1* | 5/2006 | Brockett et al. | 704/9 |
| 2007/0073532 A1* | 3/2007 | Brockett et al. | 704/9 |
| 2007/0083357 A1* | 4/2007 | Moore et al. | 704/4 |
| 2007/0219774 A1* | 9/2007 | Quirk et al. | 704/2 |
| 2007/0233460 A1* | 10/2007 | Lancaster et al. | 704/9 |
| 2008/0040096 A1* | 2/2008 | Osada et al. | 704/3 |
| 2008/0097742 A1* | 4/2008 | Ushioda | 704/3 |
| 2008/0120092 A1 | 5/2008 | Moore et al. | |
| 2008/0154577 A1 | 6/2008 | Kim et al. | |
| 2008/0215309 A1* | 9/2008 | Weischedel et al. | 704/3 |
| 2008/0300857 A1* | 12/2008 | Barbaiani et al. | 704/4 |
| 2009/0157386 A1* | 6/2009 | Zhou | 704/9 |
| 2009/0234634 A1* | 9/2009 | Chen et al. | 704/2 |
| 2009/0326912 A1* | 12/2009 | Ueffing | 704/2 |
| 2009/0326913 A1* | 12/2009 | Simard et al. | 704/2 |
| 2010/0004919 A1* | 1/2010 | Macherey et al. | 704/4 |
| 2010/0004920 A1* | 1/2010 | Macherey et al. | 704/4 |
| 2010/0023315 A1* | 1/2010 | Quirk | 704/3 |

OTHER PUBLICATIONS

Shankar Kumar, Yonggang Deng, and William Byrne. 2006. A weighted finite state transducer translation template model for statistical machine translation. Nat. Lang. Eng. 12, 1 (Mar. 2006), 35-75.*

Colin Bannard and Chris Callison-Burch. 2005. Paraphrasing with bilingual parallel corpora. In Proceedings of the 43rd Annual Meeting on Association for Computational Linguistics (ACL '05). Association for Computational Linguistics, Stroudsburg, PA, USA, 597-604.*

Richard Zens, Hermann Ney, Taro Watanabe, and Eiichiro Sumita. 2004. Reordering constraints for phrase-based statistical machine translation. In Proceedings of the 20th international conference on Computational Linguistics (COLING '04). Association for Computational Linguistics, Stroudsburg, PA, USA, Article 205.*

"Tongue Twisters—Asia Online and Clay Tablet Intertwine CMS with SMT", http://www.asiaonline.net/corporate/news.aspx#News09.

"How Statistically Based Automated Language Translation Works", http://www.languageweaver.com/page.asp?intNodeID=886&intPageID=856.

Ortiz-Martinez, et al., "Thot: a Toolkit to Train Phrase-based Statistical Translation Models", In Tenth Machine Translation Summit, Asia-Pacific Association for Machine Translation, Phuket, Thailand, Sep. 2005, pp. 141-148.

Hassan, et al., "Syntactic Phrase-Based Statistical Machine Translation", In Proceedings of the IEEE 2006 Workshop on Spoken Language Translation, 2006, 4 pages.

Isabelle, et al., "Domain Adaptation of Mt Systems through Automatic Post-Editing", Machine Translation Summit XI. Copenhague, Danemark. Du 10 au Sep. 14, 2007, pp. 255-261.

Quirk, et al., "Dependency Treelet Translation: Syntactically Informed Phrasal SMT", Proceedings of the 43rd Annual Meeting of the Association for Computational Linguistics, Ann Arbor, Michigan, USA, Jul. 2005, 9 pages.

Koehn, P., "Pharaoh: A Beam Search Decoder for Phrase-Based Statistical Machine Translation Models", In Proceedings of The 6th Conference of the Association for Machine Translation in the Americas, vol. 3265, pp. 115-124, 2004, 10 pages.

Simard, M. et al., "Statistical Phrase-based Post-editing", In Proceedings of North American Chapter of the Association for Computational Linguistics: Human Language Technologies, pp. 508-515, 2007, 8 pages.

Simard, M. et al.,"Rule-based Translation With Statistical Phrase-based Post-editing", in Proceedings of the Second Workshop on Statistical Machine Translation, pp. 203-206, Jun. 2007, 4 pages.

* cited by examiner

COMPUTERIZED STATISTICAL MACHINE TRANSLATION WITH PHRASAL DECODER

BACKGROUND

Statistical machine translation systems have advanced in recent years, and as a result the quality of machine translations has improved. However, even with this improvement, these systems are still susceptible to making translation errors. Thus, to produce an accurate translation, human editors are often employed to edit the machine translations. However, using human editors is costly and time intensive, and can drive up the cost of the translated product to the end user.

SUMMARY

A computerized system for performing statistical machine translation with a phrasal decoder is provided. The system may include a phrasal decoder trained prior to run-time on a monolingual parallel corpus, the monolingual parallel corpus including a machine translation output of source language documents of a bilingual parallel corpus and a corresponding target human translation output of the source language documents, to thereby learn mappings between the machine translation output and the target human translation output. The system may further include a statistical machine translation engine configured to receive a translation input and to produce a raw machine translation output, at run-time. The phrasal decoder may be configured to process the raw machine translation output, and to produce a corrected translation output based on the learned mappings for display on a display associated with the system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
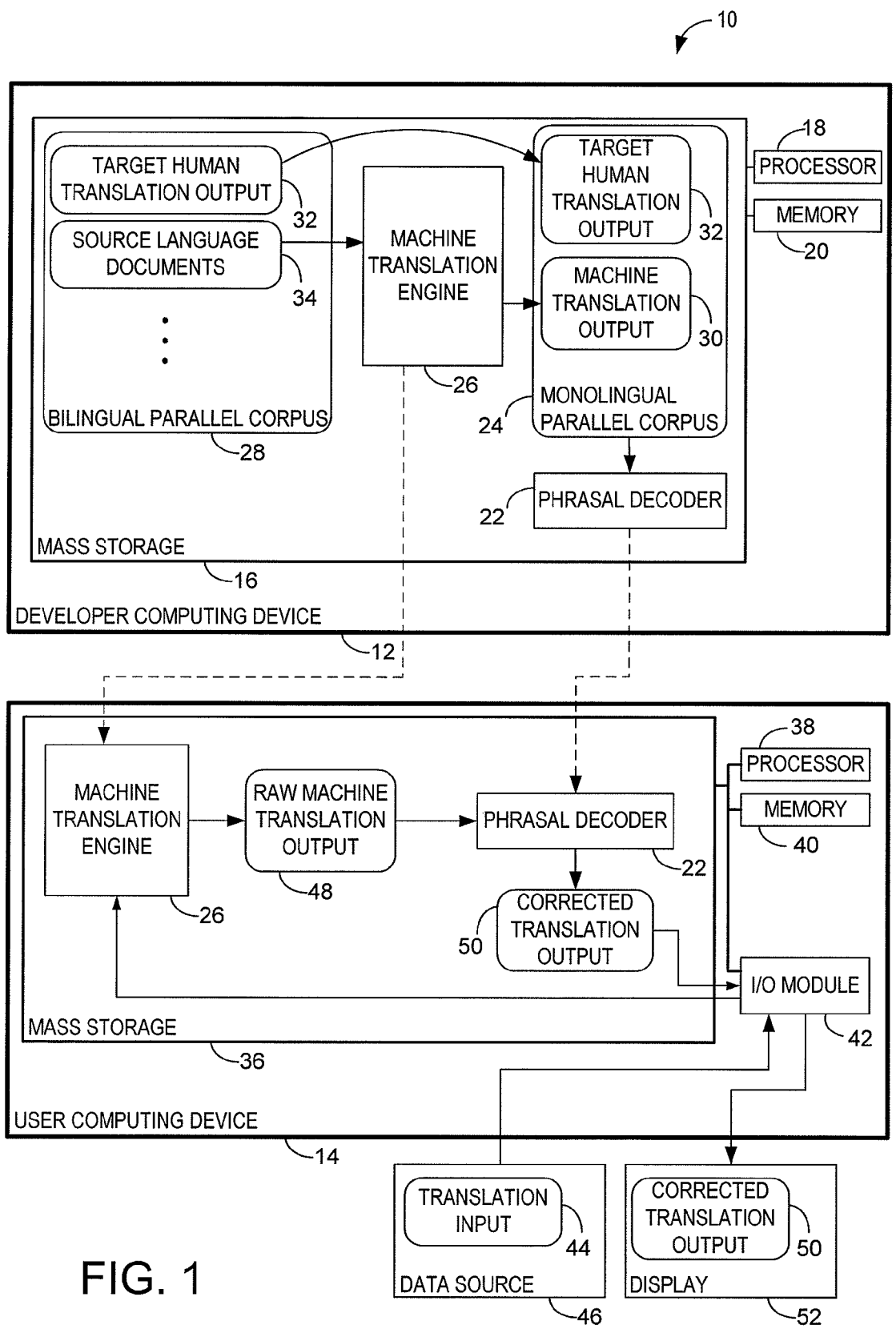
FIG. 1 is a schematic view of an embodiment of a computerized system for performing statistical machine translation with a phrasal decoder.

FIG. 1 illustrates a system 10 for performing statistical machine translation. System 10 includes a developer computing device 12 on which a phrasal decoder 22 for machine translation may be executed and trained, prior to run time. System 10 may further include a user computing device 14, on which the phrasal decoder 22 may be executed at run time, to correct an output of a statistical machine translation engine 26. The developer computing device 12 may include a mass storage device 16 on which various programs and data may be stored, as well as a respective processor 18 configured to execute the programs using portions of a memory 20. Likewise, user computing device may include a mass storage device 36, processor 38, and memory 40 that function similarly.

Phrasal decoder 22 is a type of phrase-based statistical machine translation engine, which uses a bilingual phrase table that contains bilingual phrase pairs and a statistical score representing the utility of each pair. Collectively, each phrase pair and statistical score may be referred to as a "mapping" between the members of the pair. Further, building the phrase table can be referred to as "training" the phrasal decoder.

Statistical machine translation engine 26 is an engine configured to generate translations based on statistical models, the parameters of which are at least partly derived from the statistical analyses of one or more bilingual text corpora. One example of a statistical machine translation engine that may be used in system 10 is the Microsoft® Research Machine Translation System, known by the acronym MSR-MT, although numerous other possibilities exist.

Prior to run time, phrasal decoder 22 may be trained on a monolingual parallel corpus 24 on developer computing device 12. The monolingual parallel corpus 24 may be derived in part by applying the statistical machine translation engine 26, which for example may be a syntax-based or phrased-based statistical machine translation engine, to translate source language documents 34 of a bilingual parallel corpus 28, on the developer computing device 12. The bilingual parallel corpus 28 may include bi-text training data for one or more language pairs. Each language pair of the bilingual parallel corpus 28 may have corresponding source language documents 34 and target human translation output 32. It will be appreciated that the target human translation output 32 includes accurate human translations of the source language documents 34.

Thus, the monolingual parallel corpus 24 may include a machine translation output 30 of source language documents 34 of the bilingual parallel corpus 28, and a corresponding target human translation output 32 of the source language documents 34. By training of the phrasal decoder 22 on the monolingual parallel corpus 24, the phrasal decoder thereby learns mappings between the machine translation output 30 and the target human translation output 32. These mappings are used to correct raw machine translation output 48 at run time, as described below.

To prepare for run time, the statistical machine translation engine 26 and the trained phrasal decoder 22 are installed on the user computing device 14. Once installed, the statistical machine translation engine 26 is configured to receive translation input 44 via an I/O module 42 from a data source 46. Thereafter, the machine translation engine 26 is configured to produce a raw machine translation output 48, and the phrasal decoder 22 is configured to processes this raw machine translation output 48, to produce corrected translation output 50 based on the learned mappings discussed above. With this arrangement, the phrasal decoder may be said to be "chained" to the statistical machine translation 26. The corrected translation output can thus be displayed, via the I/O module 42, on a display 52 associated with the user computing device 14 of the system 10.

Used in this manner, it will be appreciated that the phrasal decoder 22 may be configured to produce corrected translation output 50 without displaying the raw machine translation output 48 to the user, and/or without prompting the user for a correction input to correct the raw translation output. Thus, initial correction of the raw machine translation output may be automated. Additionally, in some embodiments, the corrected translation output 50 may be presented to the user for further human editing and revision, if desired.

Phrasal decoder 22 may be configured to determine the learned mappings by applying a word alignment algorithm.

The word alignment algorithm may be based on a variety of models, such as a hidden markov model (HMM), an expectation-maximization (EM) model, a discriminative model, or a syntax-based model, for example. In one embodiment, an EM model may be used such as is used in the statistical machine translation engines known as IBM® Models 1-5.

In another embodiment, a word dependent transition model-based HMM (WDHMM) such as is used in the MSR-MT statistical machine translation engine may be utilized. It will be appreciated that a hidden Markov model is one type of dynamic Bayesian network, according to which a system may be modeled as a Markov process with hidden parameters. Thus, the WDHMM word alignment algorithm may be configured to attempt to extract the hidden parameters based on observable parameters, such as the differences between the machine translation output 30 and the target human translation output 32.

Furthermore, the phrasal decoder 22 may be configured to execute the HMM-based word alignment algorithm bi-directionally, from machine translation output 30 to target human translation output 32 and from target human translation output 32 to machine translation output 30. Thus, a combined final word alignment may be produced, from which a plurality of phrasal translation pairs consistent with the combined final word alignment are extracted by the phrasal decoder 22. According to one embodiment, translation pairs having statistical scores for correspondence that are above a predetermined threshold are programmatically corrected by the phrasal decoder at run time.

System 10 may be configured to work with a variety of languages. Thus, it will be appreciated that the statistical machine translation engine 26 may be configured to translate between each of a plurality of language pairs, each language pair having a source language and a target language. Further, the monolingual parallel corpus 24 may be one of a plurality of monolingual parallel corpora 24 that the phrasal decoder 22 is trained on. Further, each of the monolingual parallel corpora may be for a target language in one of the language pairs, and thus each of the monolingual parallel corpora may include a machine translation output and a corresponding target human translation output for a given language. The target human translation output for each monolingual parallel corpus may be from a corresponding bilingual parallel corpus for one of the language pairs. Further, in some embodiments, the language pairs may be typologically different.

Figure 2:
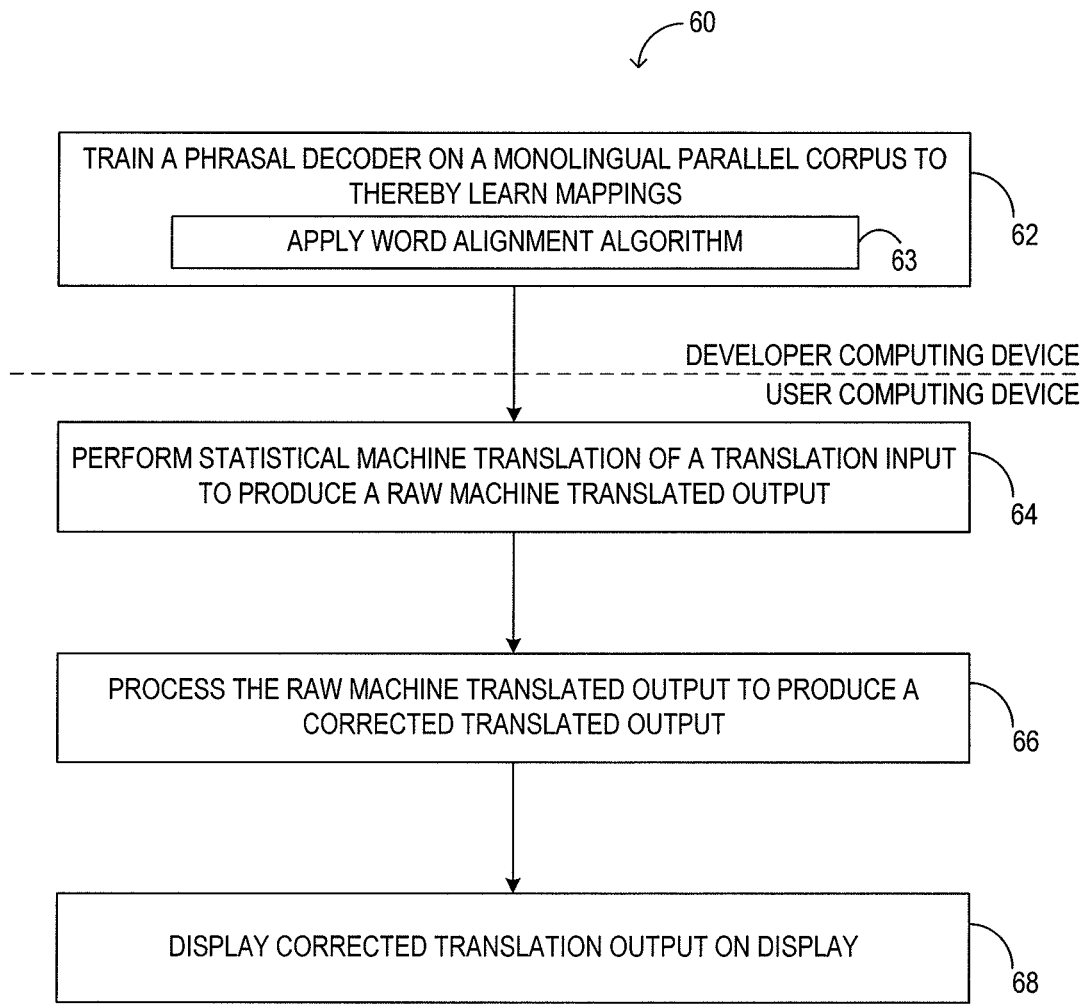
FIG. 2 is a flowchart of an embodiment of a computerized method of statistical machine translation.

Turning now to FIG. 2, this Figure illustrates an embodiment of a computerized method 60 of statistical machine translation. Method 60 may be implemented using the software and hardware components of the systems described above, or via other suitable components.

At 62, the method 60 includes training a phrasal decoder on a monolingual parallel corpus. The monolingual parallel corpus may include a machine translation output and a target human translation output, as described above, and the training of the phrasal decoder typically occurs on a developer computing device, prior to run time. The purpose of the training may be for the phrasal decoder to learn mappings between a machine translation output and a target human translation output, as described above.

The learning of mappings at 62 may further include, as illustrated at 63, applying a word alignment algorithm. The word alignment algorithm may be a hidden markov model (HMM), an expectation-maximization (EM) model, a discriminative model, or a syntax-based model, for example. In some embodiments, the WDHMM model of the MSR-MT statistical machine translation engine may be used, or the EM model of the IBM® Models 1-5 may be used.

Once the phrasal decoder is trained, the method may include, at 64 performing statistical machine translation of a translation input to produce the raw machine translation output. It will be appreciated that the step of performing statistical translation typically occurs on a user computing device, at run time. Of course, other computing devices, such as the developer computing device, may also be used to perform the statistical machine translation at 64. It will be appreciated that performing statistical machine translation of the translation input may be accomplished at least in part by a syntax-based statistical machine translation engine, as described above. In other embodiments, other types of statistical machine translation engines may be used to perform the statistical machine translation at 64, such as a phrase-based statistical machine translation engine.

Further, method 60 may be used with a variety of languages. Accordingly, the statistical machine translation of the translation input may include translating between each of a plurality of language pairs, each language pair having a source language and a target language, and that bilingual parallel corpora for each language pair and monolingual parallel corpora for each target language may be provided and used as described above to train the phrasal decoder. Further, in some embodiments, translating between each of the language pairs may include translating between each of a plurality of typologically different language pairs.

At 66, the method may further include processing the raw machine translation output to produce a corrected translation output based on the learned mappings of the phrasal decoder. In some embodiments, processing the raw machine translation output occurs without displaying the raw machine translation output and/or without prompting the user for a correction input. It will also be appreciated that processing the raw machine translation output to thereby produce a corrected translation output may be accomplished at least in part by a phrase-based statistical machine translation engine, as described above. Finally, at 68, the method may include displaying the corrected translation output on a display.

The systems and method described above may be used to programmatically correct machine translation output at run time using a chained statistical machine translation engine and phrasal decoder, to thereby increase the accuracy of a machine translation system. By utilizing a phrasal decoder that is trained on bilingual parallel corpora, the system is scalable and flexible, since such corpora may already exist in the data stores of many machine translation developers, and additional laborious human input may be avoided during the training process.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A computerized system for performing statistical machine translation, the system comprising:
   a statistical machine translation engine executed on a user computing device, the statistical machine translation engine trained on a bilingual parallel corpus including source language documents and a corresponding target human translation of the source language documents, and configured to receive a translation input and to produce a raw machine translation output, at run-time;
   a phrasal decoder, separate and distinct from the statistical machine translation engine, executed on the user computing device, the phrasal decoder being trained prior to run-time on a monolingual parallel corpus, the monolingual parallel corpus including a machine translation output of the source language documents of the bilingual parallel corpus and the corresponding target human translation output of the source language documents of the bilingual parallel corpus, to thereby learn mappings and build a phrase table by establishing phrase pairs between the machine translation output and the target human translation output, wherein the machine translation output is unedited by human translators, and wherein the phrasal decoder is trained prior to run-time on a developer computing device on which the bilingual parallel corpus is stored, assigning to each phrase pair a statistical score representing a utility of each phrase pair; and
   wherein at run-time on the user computing device the phrasal decoder is configured to process the raw machine translation output, and to produce a corrected translation output based on the learned mappings and the phrase table, programmatically correcting the raw machine translation output if a statistical score for correspondence of the phrase pair is above a predetermined threshold.

2. The computerized system of claim 1, wherein the phrasal decoder is configured to determine the learned mappings by applying a word alignment algorithm.

3. The computerized system of claim 2, wherein the word alignment algorithm is selected from the group consisting of a hidden markov model (HMM), an expectation-maximization (EM) model, a discriminative model, and a syntax-based model.

4. The computerized system of claim 1, wherein the bilingual parallel corpus includes bi-text training data for one or more language pairs, the bi-text training data including source language documents and target human translation output for each language pair.

5. The computerized system of claim 1, wherein the statistical machine translation engine is configured to translate between each of a plurality of language pairs, each language pair having a source language and a target language;
   wherein the monolingual parallel corpus is one of a plurality of monolingual parallel corpora that the phrasal decoder is trained on, each of the monolingual parallel corpora being for a target language in one of the language pairs, and each of the monolingual parallel corpora including a machine translation output and a corresponding target human translation output; and
   wherein the target human translation output for each monolingual parallel corpora is from a corresponding bilingual parallel corpus for one of the language pairs.

6. The computerized system of claim 5, wherein the language pairs are typologically different language pairs.

7. The computerized system of claim 1, wherein the statistical machine translation engine includes a syntax-based statistical machine translation engine; and
   wherein the phrasal decoder includes a phrase-based statistical machine translation engine.

8. The computerized system of claim 1, wherein the phrasal decoder is configured to produce the corrected translation output without prompting a user for a correction input.

9. A computerized method of statistical machine translation, the method comprising:
   training a statistical machine translation engine on a bilingual parallel corpus including source language documents and a corresponding target human translation of the source language documents;
   training a phrasal decoder, separate and distinct from the statistical machine translation engine, on a monolingual parallel corpus, the monolingual parallel corpus including a machine translation output of the source language documents of the bilingual parallel corpus and the corresponding target human translation output of the source language documents of the bilingual parallel corpus, to thereby learn mappings and build a phrase table by establishing phrase pairs between the machine translation output and the target human translation output, wherein the machine translation output is unedited by human translators, assigning to each phrase pair a statistical score representing a utility of each phrase pair;
   performing statistical machine translation via the statistical machine translation engine trained on the bilingual parallel corpus of a translation input to thereby produce a raw machine translation output; and
   processing the raw machine translation output to thereby produce a corrected translation output based on the learned mappings and the phrase table, programmatically correcting the raw machine translation output if a statistical score for correspondence of the phrase pair is above a predetermined threshold.

10. The computerized method of claim 9, wherein learning mappings between the machine translation output and the target human translation output includes applying a word alignment algorithm.

11. The computerized method of claim 10, wherein the word alignment algorithm is selected from the group consisting of a hidden markov model (HMM), an expectation-maximization (EM) model, a discriminative model, and a syntax-based model.

12. The computerized method of claim 9, wherein the bilingual parallel corpus includes bi-text training data for one or more language pairs, the bi-text training data including source language documents and target human translation output for each language pair.

13. The computerized method of claim 9, wherein performing statistical machine translation of a translation input includes translating between each of a plurality of language pairs, each language pair having a source language and a target language;
   wherein the monolingual parallel corpus is one of a plurality of monolingual parallel corpora that the phrasal decoder is trained on, each of the monolingual parallel corpora being for a target language in one of the language pairs, and each of the monolingual parallel corpora including a machine translation output and a corresponding target human translation output; and wherein the target human translation output for each monolingual parallel corpora is from a corresponding bilingual parallel corpus for one of the language pairs.

14. The computerized method of claim 13, wherein translating between each of the language pairs includes translating between each of a plurality of typologically different language pairs.

15. The computerized method of claim 9, wherein training the phrasal decoder occurs on a developer computing device on which the bilingual parallel corpus is stored;

wherein performing statistical machine translation of a translation input to thereby produce a raw machine translation output and processing the raw machine translation output to thereby produce a corrected translation output occurs on a user computing device.

16. The computerized method of claim 9, wherein performing statistical machine translation of a translation input is accomplished at least in part by a syntax-based statistical machine translation engine; and wherein processing the raw machine translation output to thereby produce a corrected translation output is accomplished at least in part by a phrase-based statistical machine translation engine.

17. The computerized method of claim 9, wherein processing the raw machine translation output to thereby produce a corrected translation output occurs without prompting a user for a correction input.

18. A computerized system for performing statistical machine translation, the system comprising:

a user computing device configured to execute:

a statistical machine translation engine trained on a bilingual parallel corpus including source language documents and a corresponding target human translation of the source language documents and configured to receive a translation input and to produce a raw machine translation output, at run-time; and a phrasal decoder, separate and distinct from the statistical machine translation engine, configured at run-time to process the raw machine translation output, and to produce a corrected translation output for display on a display associated with the system;

wherein the phrasal decoder, separate and distinct from the statistical machine translation engine, is trained on a developer computing device prior to run-time based on a monolingual parallel corpus, the monolingual parallel corpus including a machine translation output of the bilingual parallel corpus and the corresponding target human translation output included within the bilingual parallel corpus, the machine translation output being unedited by human translators, to thereby learn mappings and build a phrase table by establishing phrase pairs between the machine translation output and the target human translation output, assigning to each phrase pair a statistical score representing a utility of each phrase pair, and wherein at run time on the user computing device the corrected translation output is produced based on a plurality of the learned mappings and the phrase table, programmatically correcting the raw machine translation output if a statistical score for correspondence of the phrase pair is above a predetermined threshold.

* * * * *